United States Patent
Pfeifer et al.

(10) Patent No.: US 8,226,896 B2
(45) Date of Patent: Jul. 24, 2012

(54) CATALYTIC ACTIVATED DIESEL PARTICLE FILTER WITH AMMONIA TRAP EFFECT

(75) Inventors: Marcus Pfeifer, Solingen (DE); Markus Koegel, Romesburg (DE); Wolfgang Schneider, Rodenbach (DE); Nicola Soeger, Frankfurt am Main (DE); Katja Adelmann, Rodenbach (DE); Gerald Jeske, Neuberg (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 329 days.

(21) Appl. No.: 12/525,678

(22) PCT Filed: Jan. 28, 2008

(86) PCT No.: PCT/EP2008/000631
§ 371 (c)(1),
(2), (4) Date: Nov. 6, 2009

(87) PCT Pub. No.: WO2008/101585
PCT Pub. Date: Aug. 28, 2008

(65) Prior Publication Data
US 2010/0058746 A1    Mar. 11, 2010

(30) Foreign Application Priority Data
Feb. 23, 2007  (EP) .................................... 07003720

(51) Int. Cl.
*B01D 50/00*  (2006.01)
(52) U.S. Cl. ...................................... 422/171; 422/177
(58) Field of Classification Search .................. 422/177, 422/180; 60/297, 299
See application file for complete search history.

(56) References Cited

U.S. PATENT DOCUMENTS

| 5,120,695 | A | 6/1992 | Blumrich et al. |
| 5,185,305 | A * | 2/1993 | Subramanian et al. .......... 502/65 |
| 6,345,496 | B1 | 2/2002 | Fuwa et al. |
| 6,732,507 | B1 | 5/2004 | Stanglmaier et al. |
| 2007/0081925 | A1 * | 4/2007 | Widenmeyer ................. 422/177 |
| 2008/0317999 | A1 * | 12/2008 | Patchett et al. ............... 428/116 |

FOREIGN PATENT DOCUMENTS

| DE | 39 29 297 A1 | 1/1991 |
| DE | 39 29 297 C2 | 3/1996 |
| DE | 20 2005 008146 U1 | 7/2005 |
| DE | 20 2005 008 146 U1 | 9/2005 |
| JP | 2005-238199 | 8/2005 |

(Continued)

OTHER PUBLICATIONS

SAE International—The Engineering Society for Advancing Mobility Land Sea Air and Space, "Development of New Concept Three-Way Catalyst for Automotive Lean-Burn Engines" (950809); Miyoshi et al., International Congress and Exposition, Detroit, Michigan, Feb. 27-Mar. 2, 1995.

(Continued)

*Primary Examiner* — Tom Duong
(74) *Attorney, Agent, or Firm* — Smith, Gambrell & Russell, LLP (57) ABSTRACT

A catalytically active diesel particulate filter with ammonia trap action is presented, which, in addition to an oxidation-active coating (2), comprises a coating (1) which is catalytically active in the SCR reaction. By means of this inventive diesel particulate filter, it is possible to make exhaust gas aftertreatment systems for removing nitrogen oxides and particulates from the exhaust gas of lean engines considerably simpler and less expensive.

20 Claims, 9 Drawing Sheets

FOREIGN PATENT DOCUMENTS

| | | |
|---|---|---|
| JP | 2005 238199 | 9/2005 |
| WO | 99/39809 | 8/1999 |
| WO | WO 99/39809 | 8/1999 |
| WO | 02/100520 A1 | 12/2002 |
| WO | WO 02/100520 | 12/2002 |
| WO | 2005/064130 A | 7/2005 |
| WO | WO 2005/064130 | 7/2005 |

OTHER PUBLICATIONS

SAE International—SAE 100 Technical Paper Series, "The Second Generation of Catalyzed Diesel Particulate Filter Systems for Passenger Cars—Particulate Filters with Integrated Oxidation Catalyst Function" (2005-01-1756), Pfeifer et al., 2005 SAE World Congress, Detroit, Michigan, Apr. 11-14, 2005.

PCT Written Opinion of the International Search Authority with International Search Report for International Application No. PCT/EP2008/000631 filed Jan. 28, 2008.

International Search Report issued in corresponding International Application No. PCT/EP2008/000631 filed Jan. 28, 2008.

International Preliminary Report on Patentability issued in corresponding international application No. PCT/EP2008/000631 filed on Jan. 28, 2008.

* cited by examiner

CATALYTIC ACTIVATED DIESEL PARTICLE FILTER WITH AMMONIA TRAP EFFECT

The invention relates to a catalytically active diesel particulate filter which, in addition to the properties typical of a diesel particulate filter, has an ammonia blocking function. The invention further relates to exhaust gas aftertreatment systems for removal of nitrogen oxides and particulates from the exhaust gas of internal combustion engines operated under predominantly lean conditions using the inventive catalytically active diesel particulate filter in different embodiments.

The emissions present in the exhaust gas of a motor vehicle can be divided into two groups. Thus, the term "primary emission" refers to pollutant gases which form directly through the combustion process of the fuel in the engine and are already present in the untreated emission before it passes through emission control units. Secondary emission refers to those pollutant gases which can form as by-products in the emission control system.

The exhaust gas of lean engines comprises, as well as the customary primary emissions of carbon monoxide CO, hydrocarbons HC and nitrogen oxides $NO_N$, a relatively high oxygen content of up to 15% by volume. In the case of diesel engines, there is additional particulate emission as well as the gaseous primary emissions, which consists predominantly of soot residues, with or without organic agglomerates, and originates from partially incomplete fuel combustion in the cylinder.

Especially in the case of diesel vehicles, complying with the emissions limits stipulated by the future emissions legislation in Europe, North America and Japan requires not only nitrogen oxide removal from the exhaust gas ("denitrification") but also the cleaning thereof to remove particulates. The carbon monoxide and hydrocarbon pollutant gases from the lean exhaust gas can easily be rendered harmless by oxidation over a suitable oxidation catalyst. The reduction of the nitrogen oxides to nitrogen is much more difficult owing to the high oxygen content. For the removal of the particulate emissions, the use of specific diesel particulate filters is unavoidable.

Known methods for removing nitrogen oxides from exhaust gases are firstly methods using nitrogen oxide storage catalysts (NSCs) and secondly methods for selective catalytic reduction (SCR) by means of ammonia over a suitable catalyst, SCR catalyst for short.

The cleaning action of nitrogen oxide storage catalysts is based on the nitrogen oxides being stored in a lean operating phase of the engine by the storage material of the storage catalyst, predominantly in the form of nitrates. When the storage capacity of the NSC is exhausted, the catalyst has to be regenerated in a subsequent rich operating phase of the engine. This means that the nitrates formed beforehand are decomposed and the nitrogen oxides released again are reacted with the reducing exhaust gas components over the storage catalyst to give nitrogen, carbon dioxide and water. The operation of nitrogen oxide storage catalysts is described in detail in the SAE document SAE 950809.

Since the implementation of a rich operating phase in diesel engines is not straightforward and the establishment of the rich exhaust gas conditions required for regeneration of the NSC frequently entails auxiliary measures such as fuel postinjection into the exhaust gas line, the SCR method is used preferentially for denitrification of diesel motor vehicle exhaust gases.

In this method, according to the engine design and construction of the exhaust gas system, a distinction is made between "active" and "passive" SCR methods, "passive" SCR methods involving use of ammonia secondary emissions generated deliberately in the exhaust gas system as a reducing agent for denitrification.

For example, U.S. Pat. No. 6,345,496 B1 describes a method for cleaning engine exhaust gases, in which repeatedly alternating lean and rich air/fuel mixtures are established and the exhaust gas thus produced is passed through an exhaust gas system which comprises, on the inflow side, a catalyst which converts $NO_x$ to $NH_3$ only under rich exhaust gas conditions, while a further catalyst arranged on the outflow side adsorbs or stores $NO_x$ in the lean exhaust gas, and releases it under rich conditions, such that it can react with $NH_3$ generated by the inflow-side catalyst to give nitrogen. As an alternative, according to U.S. Pat. No. 6,345,496 B1, an $NH_3$ adsorption and oxidation catalyst may be arranged on the outflow side, which stores $NH_3$ under rich conditions, desorbs it under lean conditions and oxidizes it with oxygen to give nitrogen and water. Further disclosures of such methods are known.

Like the use of the nitrogen oxide storage catalysts, such "passive" SCR methods have the disadvantage that one of their essential constituents is the provision of rich exhaust gas conditions, which are generally required for in situ generation of ammonia as a reducing agent.

Compared to this, in "active" SCR methods, the reducing agent is metered into the exhaust gas line from an addition tank carried in the vehicle by means of an injection nozzle. Such a reducing agent used may, apart from ammonia, also be a compound readily decomposable to ammonia, for example urea or ammonium carbamate. Ammonia has to be supplied to the exhaust gas at least in a stoichiometric ratio relative to the nitrogen oxides. Owing to the greatly varying operation conditions of the motor vehicles, the exact metered addition of the ammonia presents great difficulties. This leads in some cases to considerable ammonia breakthroughs downstream of the SCR catalyst. To prevent secondary ammonia emission, an oxidation catalyst is usually arranged downstream of the SCR catalyst, which is intended to oxidize ammonia which breaks through to nitrogen. Such a catalyst is referred to hereinafter as an ammonia slip catalyst.

Ammonia slip catalysts which are arranged downstream of an SCR catalyst for oxidation of ammonia which breaks through are known in various embodiments. For instance, DE 3929297 C2 (U.S. Pat. No. 5,120,695) describes such a catalyst arrangement. Accordingly, the oxidation catalyst is applied as a coating to an outflow-side section of the reduction catalyst configured in one-piece form as a solid extrudate in honeycomb form, the region coated with the oxidation catalyst making up 20 to 50% of the overall catalyst volume. The oxidation catalyst comprises, as catalytically active components, at least one of the platinum group metals, platinum, palladium and rhodium, which are deposited on cerium oxide, zirconium oxide and aluminum oxide as support materials.

According to EP 1 399 246 B1, the platinum group metals can also be applied directly to the components of the reduction catalyst as support materials by impregnation with soluble precursors of the platinum group metals.

According to JP 2005-238199, the precious metal-containing layer of an ammonia oxidation catalyst can also be introduced below a coating of titanium oxide, zirconium oxide, silicon oxide or aluminum oxide and a transition metal or a rare earth metal.

To remove particulate emissions from the exhaust gas of diesel motor vehicles, specific diesel particulate filters are used, which may be provided with an oxidation catalystcontaining coating to improve their properties. Such a coating serves, as described in detail in SAE publication SAE 2005-01-1756, to lower the activation energy for oxygen-based particulate burnoff (soot combustion) and hence to lower the soot ignition temperature on the filter, to improve the passive regeneration performance by oxidation of nitrogen monoxide present in the exhaust gas to nitrogen dioxide, and to suppress breakthroughs of hydrocarbon and carbon monoxide emissions.

A particular problem in the coating of filter substrates is that of the increase in the exhaust gas backpressure as a result of the coating applied. The exhaust gas backpressure already increases continuously as a result of the soot deposits on the filter during operation and thus reduces the performance of the engine. The filter therefore has to be regenerated from time to time by burning off the soot. When the filter is a coated filter substrate, the soot burnoff is generally facilitated, but the exhaust gas backpressure of the coated filter without deposits is often already higher than that of an uncoated filter. It is therefore not immediately possible to alter the catalytic functionality of a particulate filter by alterations to the coating, for example by introducing additionally catalytically active components.

If compliance with legal emissions standards requires both denitrification and removal of particulates from the exhaust gas of diesel motor vehicles, the described measures for removing individual pollutant gases are combined in a corresponding conventional exhaust gas system by connection in series. For example, WO 99/39809 describes an exhaust aftertreatment system wherein an oxidation catalyst for oxidation of NO in $NO_x$ to $NO_2$, a particulate filter, a metering unit for a reducing agent and an SCR catalyst follow on each other. To prevent ammonia breakthroughs, an additional ammonia slip catalyst is generally required downstream of the SCR catalyst, and continues the series of catalysts on the outflow side of the SCR catalyst.

DE 20 2005 008 146 U1 discloses an exhaust gas system for a motor vehicle, comprising at least one regeneratable particulate filter and an SCR catalyst with ammonia storage capacity connected downstream of the particulate filter, wherein the downstream SCR catalyst, according to the information in this document, serves to scavenge especially the $NH_3$ peaks which occur during the regeneration of the particulate filter in the exhaust gas, which is why the SCR catalyst is connected downstream of the particulate filter.

Such conventional systems are expensive owing to the multitude of catalysts required. The series connection of the catalysts additionally leads to a high demand for installation space in the exhaust gas system. Their accommodation is often found to be difficult especially in smaller vehicles. Furthermore, the series connection of catalysts, each of which exerts its own backpressure on the exhaust gas to be cleaned, leads to unfavorable values of the exhaust gas backpressure over the entire exhaust gas system and thus reduces the performance of the engine.

In a preferred embodiment of the system described in DE 20 2005 008 146 U1, the particulate filter and the SCR catalyst form a common, combined unit with a common insert body, which is typically a monolithic ceramic substrate. The SCR catalyst is formed here only by a corresponding coating of the ceramic substrate on the outflow side.

It is an object of the present invention, by improving existing particulate filter technologies, to provide devices whose use allows exhaust gas aftertreatment systems for simultaneous denitrification and removal of particulates from the exhaust gas of lean engines to be simplified while dispensing with exhaust gas cleaning units. It is likewise an object of the present invention to make a contribution to the minimization of the exhaust gas backpressure of such systems and at the same time to show potential for cost saving.

This object is achieved by a catalytically active diesel particulate filter which comprises a filter body and an oxidation-active catalytic coating and a further coating which is catalytically active in the SCR reaction. The coating which is catalytically active in the SCR reaction is featured in that an ammonia storage material is present therein. The diesel particulate filter is characterized in that an arrangement of the layers is maintained such that the exhaust gas to be cleaned primarily passes through the coating which is catalytically active in the SCR reaction and subsequently through the oxidation-active catalytic coating.

The object is further achieved by an exhaust gas aftertreatment system for removing nitrogen oxides and particulates from the exhaust gas of internal combustion engines operated under predominantly lean conditions, which, in addition to a catalyst suitable for removing nitrogen oxides, comprises an inventive catalytically active diesel particulate filter.

Figure 1:
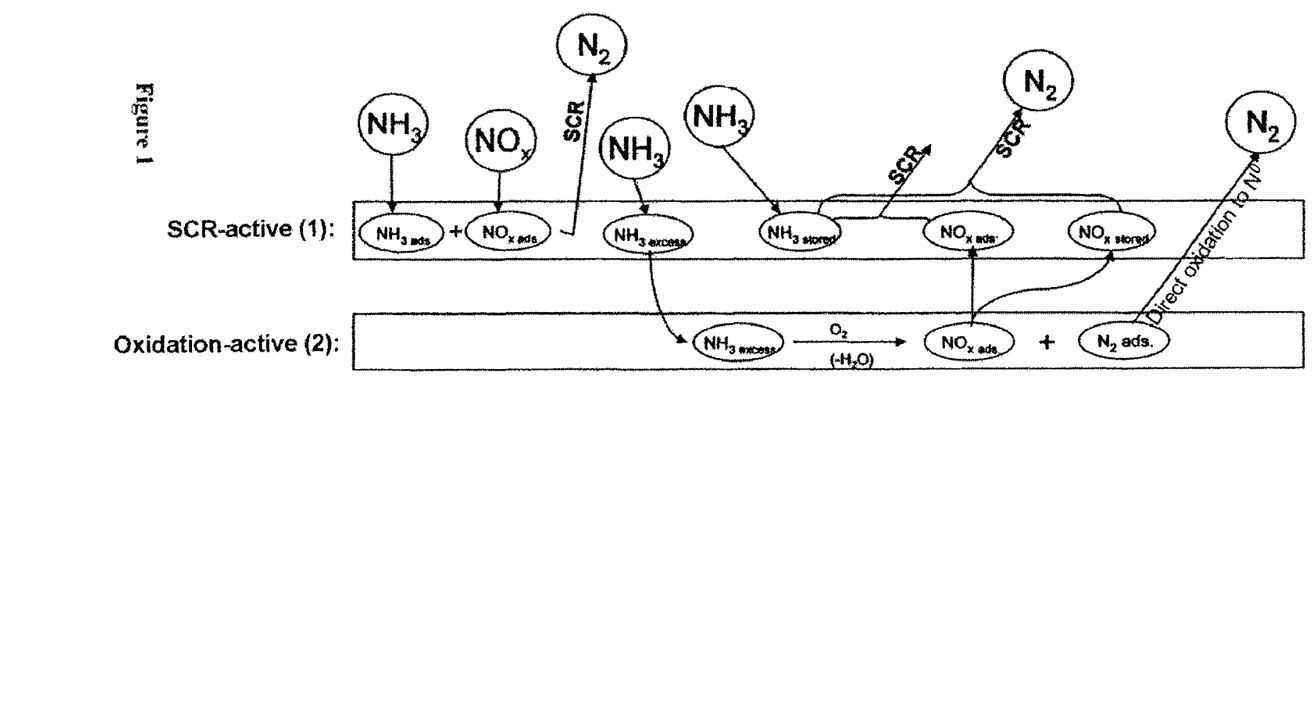
FIG. 1: Principle of function of the inventive diesel particulate filter in the conversion of nitrogen-containing pollutant gases.

By virtue of the combination of the oxidation-active coating which may already be present in conventional particulate filters with a coating which is catalytically active in the SCR reaction ("SCR coating"; "SCR-active layer"), the diesel particulate filter comprises an additional ammonia blocking function. The combination of the coatings enables the particulate filter, in addition to the functions already present (particulate filtering/particulate burnoff with lowered soot ignition temperature; improved passive regeneration performance, NO oxidation, suppression of breakthroughs of CO and HC emissions), firstly to reduce nitrogen oxides to nitrogen and secondly to oxidize ammonia to nitrogen. When the exhaust gas to be cleaned primarily passes through the SCR-active layer and subsequently the oxidation-active coating, the multifunctionality with regard to the conversion of the nitrogen-containing pollutant gases is thought to be based on the following reaction profile shown schematically in FIG. 1:

1) Nitrogen oxides and ammonia from the exhaust gas are absorbed on the SCR-active layer (1) and react in a selective catalytic reaction to give water and nitrogen, which desorb on completion of reaction. Ammonia is present in a superstoichiometric amount, i.e. is present in excess.
2) Excess ammonia diffuses into the SCR-active layer (1). Some of the ammonia is stored there.
3) Unstored ammonia passes through the SCR-active layer (1) to the oxidation-active coating (2). Nitrogen and nitrogen oxides are generated here. The nitrogen formed diffuses unchanged through the SCR-active layer (1) and passes into the atmosphere.
4) Before the nitrogen oxides formed in the oxidation-active layer (2) leave the system, they again pass through the SCR-active coating (1).
   They are reacted here with ammonia stored before-hand $NH_{3\_stored}$ in an SCR reaction to give $N_2$.

In order that the reaction profile described leads to maximum conversions of the nitrogen-containing pollutant gases, it is advantageous when the SCR-active coating possesses sufficient ammonia storage capacity. In order to ensure this, the SCR-active layer in the inventive diesel particulate filter comprises an ammonia storage material. In the context of this document, ammonia storage materials are compounds which contain acidic sites at which ammonia can be bound. The person skilled in the art distinguishes these into Lewis-acidic sites for physisorption of ammonia and Brønsted-acidic sites for chemisorption of ammonia. An ammonia storage material in an inventive diesel particulate filter must contain a significant proportion of Brønsted-acidic sites, with or without Lewis-acidic sites, in order to ensure sufficient ammonia storage capacity.

How high the ammonia storage capacity of a catalytic material is can be determined with the aid of temperature-programmed desorption. In this standard method for characterizing heterogeneous catalysts, the material to be characterized, after baking out any adsorbed components, for example water, is laden with a defined amount of ammonia gas. This is done at room temperature. The sample is then heated under inert gas at, a constant heating rate, such that ammonia gas absorbed beforehand by the sample is desorbed and can be detected quantitatively with a suitable analysis system. As a parameter for the ammonia storage capacity of the material, an amount of ammonia in milliliters per gram of catalyst material is obtained, the term "catalyst material" always referring to the material used for characterization. This parameter is dependent on the selected heating rate. Values reported in this document are always based on measurements with a heating rate of 4 Kelvin per minute.

The ammonia storage capacity of the coating which is catalytically active in the SCR reaction in the inventive diesel particulate filter is preferably at least milliliters of ammonia per gram of catalyst material, more preferably up to 70 milliliters per gram of catalyst material. Particularly suitable SCR-active layers are those having an ammonia storage capacity of 25 to 40 milliliters of ammonia per gram of catalyst material.

SCR-active coatings with the ammonia storage properties described preferably comprise zeolites which can be exchanged with hydrogen cations ("H zeolites") or transition metal cations. Very suitable are with iron or copper or iron and copper exchanged zeolites, which are preferably beta-zeolite or Y-zeolite or faujasite or mordenite or ZSM-5 or combinations thereof.

In particularly suitable configurations of the invention, the SCR-active coating in the inventive diesel particulate filter is free of precious metals. This ensures that the selectivity in the SCR reaction is as high as possible. To further improve the SCR activity, it is also possible for additives selected from the group consisting of cerium oxide, titanium oxide, zirconium oxide, vanadium oxide, molybdenum oxide, tungsten oxide, silicon dioxide, and mixtures and/or mixed oxides thereof, to be present.

Many conventional diesel particulate filters comprise an oxidation-active coating. In the inventive diesel particulate filter, this is preferably free of zeolites. In particularly suitable configurations of the invention, the oxidation-active catalytic coating comprises platinum or palladium or mixtures thereof on a support material selected from the group consisting of high-surface area active aluminum oxide, cerium oxide, zirconium oxide, titanium oxide, silicon oxide and mixtures or mixed oxides thereof.

The oxidation-active catalytic coating and the coating which is catalytically active in the SCR reaction are applied in a defined manner to a filter body suitable for deposition of diesel particulates. Suitable filter bodies are selected from the group of the ceramic wall flow filter substrates, the sintered metal filter bodies or the ceramic or metallic foam structures. Preference is given to using ceramic wall flow filter substrates which have walls with an open-pore structure with a porosity of 40 to 80% and a mean pore diameter of 9 to 30 micrometers. Particular preference is given to using ceramic wall flow filter substrates with a porosity of 45 to 65% and a mean pore diameter of 9 to 22 micrometers.

When the coatings are applied to the filter body, it should firstly be ensured that the arrangement of the layers required for the reaction mechanism described is complied with, such that the exhaust gas to be cleaned primarily passes through the coating which is catalytically active in the SCR reaction and subsequently through the oxidation-active catalytic coating. In addition, it must be possible for the exhaust gas to diffuse back from the oxidation-active coating through the SCR-active coating into the gas space. On the other hand, it should be ensured that the backpressure properties of the resulting catalytically activated diesel particulate filter are not significantly worsened. This sum of requirements constitutes a challenge in the production of the inventive catalytically active diesel particulate filter.

Figure 2:
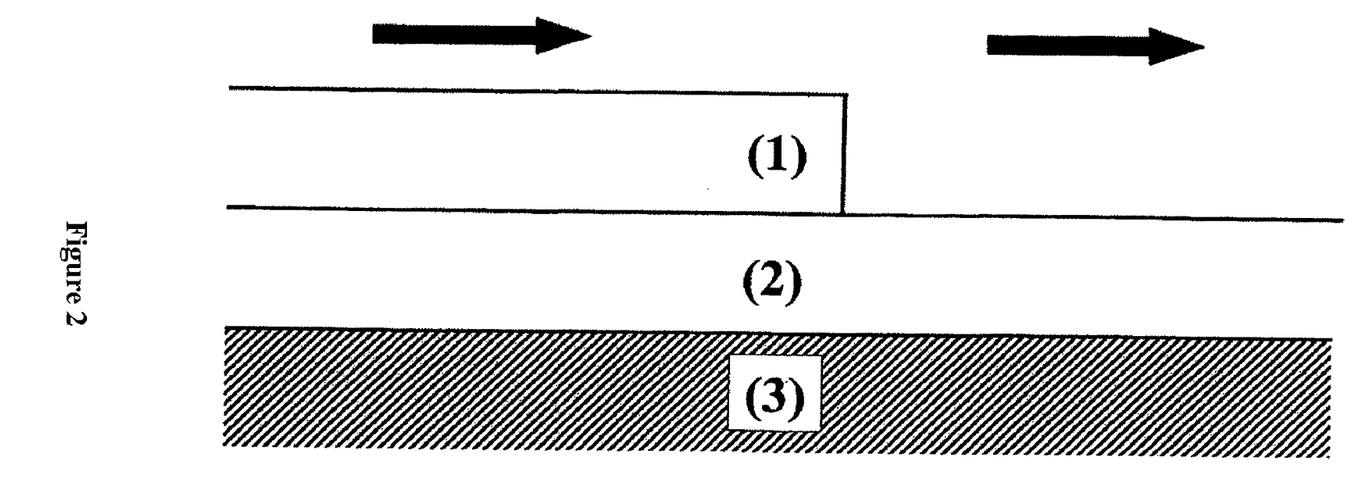
FIG. 2: Arrangement of the SCR-active coating (1) and of the oxidation-active coating (2) on a filter body (3) which serves as a support body in an inventive catalytically active diesel particulate filter.

Regardless of the type of the filter body used, the oxidation-active catalytic coating (2) is first applied to the filter body (3) which serves as the support body, and occupies the entire length of the device. The resulting filter with a coating for oxidation catalysis then constitutes the support body for the coating (1) which is catalytically active in the SCR reaction. The SCR-active coating is thus applied to the oxidation-active coating. In the preferred embodiment, the SCR-active coating occupies only part of the length of the device and is arranged on the inflow side, as shown in FIG. 2. The flow direction of the exhaust gas is indicated with an arrow. By virtue of this arrangement, the exhaust gas to be cleaned, in accordance with the requirements from the assumed reaction mechanism, first comes into contact with the SCR-active coating, before it can be converted over the oxidation-active coating. Diffusion of the exhaust gas back through the SCR-active coating into the gas space, for which close contact of the two layers is a prerequisite, is also ensured. Furthermore, the reduction of the SCR-active coating to part of the component length a) ensures the minimization of the backpressure of the device and b) ensures that the properties advantageous for a catalytically coated diesel particulate filter, such as particulate burnoff at lowered soot ignition temperature, improved passive regeneration performance and suppression of breakthroughs of CO and HC emissions, are maintained.

The question as to what proportion of the length of the device the SCR-active coating should occupy depends on the flow rate of the exhaust gas to be cleaned and the concentration of the nitrogen-containing pollutant gases present therein. It should be such that ammonia breakthroughs which occur can be converted fully to nitrogen. The catalytic coating which is active in the SCR reaction preferably occupies 5 to 50% of the length of the device, more preferably 10 to 30%.

In the preferred configurations of the invention, a wall flow filter substrate is used. To minimize the backpressure of the inventive catalytically active diesel particulate filter, the oxidation-active catalytic coating is introduced into the pores of the walls of the ceramic wall flow filter substrate over the entire length of the component, such that it is distributed homogeneously in the particular wall of the wall flow filter substrate. How this coating should be performed is described, for example, in DE 10 2004 040 548 A1 to this applicant.

Figure 3:
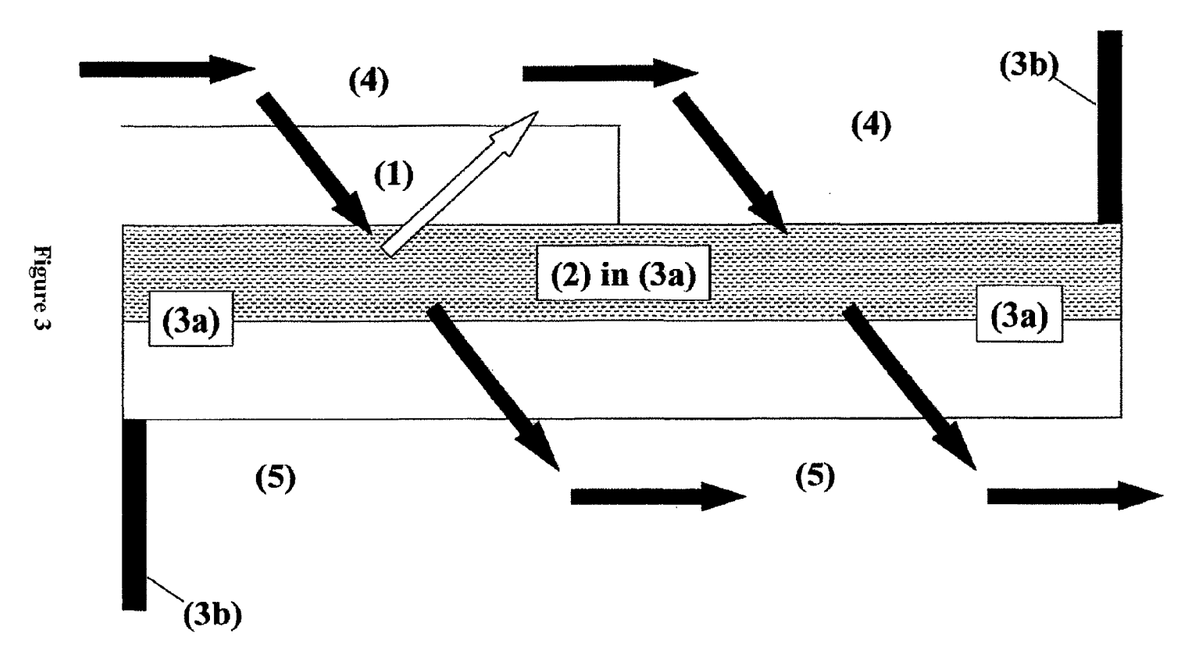
FIG. 3: Preferred arrangement of the SCR-active coating (1) in an inventive catalytically active diesel particulate filter, wherein the oxidation-active catalytic coating (2) is distributed homogeneously in the wall (3a) of the wall flow filter substrate and is in direct contact with the inflow channel (4); (5) denotes the outflow channel, (3b) the channel ends which are gas-tight in each case.
Figure 4:
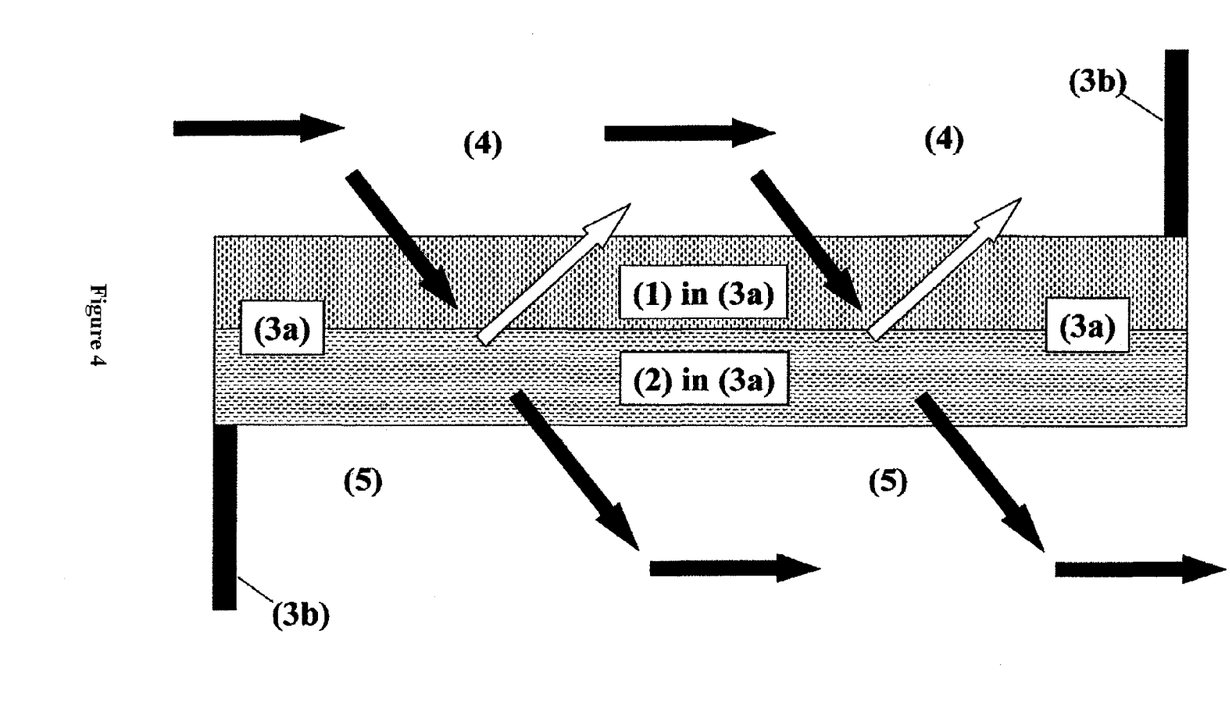
FIG. 4: Preferred arrangement of the coatings in an inventive catalytically active wall flow filter substrate in which both coatings are distributed homogeneously in the wall (3a), the SCR-active coating (1) filling the wall (3a) toward the inflow channel (4), while the oxidation-active coating (2) fills the wall (3a) toward the outflow channel (5); (3b) denotes the channel ends which are gas-tight in each case.

FIGS. 3 and 4 show particularly preferred coating arrangements in catalytically activated wall flow filter substrates as sections of the structure with in each case an inflow channel (4) and an outflow channel (5). The flow direction of the exhaust gas is indicated by arrows. The inflow and outflow channels are separated from one another by a wall (3a) with open-pore structure which is pervious to the exhaust gas, and sealed, respectively, from the outflow and inflow side by a gas-tight channel end (3b).

The embodiment of the inventive catalytically active diesel particulate filter shown in FIG. 3 is prefer-ably selected when a conventional wall flow filter substrate comprising an oxidation-active coating is to be extended to include an ammonia blocking function without losing its existing properties. It is quite common for such conventional catalytically active wall flow filter substrates to have an oxidation-active coating which is distributed homogeneously in the wall over the entire length of the component, which fills the pores up to the inflow-side surface. To obtain the ammonia blocking function, a coating which is catalytically active in the SCR reaction is applied over part of the length of the component to such a particulate filter on the inflow side. The SCR-active layer is preferably arranged on the inflow-side surface of the wall and occupies 5 to 50& of the length of the component, more preferably 10 to 30%.

The embodiment shown in FIG. 4 is particularly preferred when the inventive catalytically active diesel particulate filter is used in an exhaust gas aftertreatment system which firstly possesses a highly active oxidation function connected upstream on the inflow side for elimination of CO and HC breakthroughs, and in which there is secondly increased demand for denitrification of the exhaust gas, when the inventive diesel particulate filter is generally exposed therein to exhaust gas temperatures in the range from 100 to 250° C. In this embodiment, both the oxidation-active coating and the SCR-active coating are distributed homogeneously in the wall over the entire length of the device, the SCR-active coating filling the pores up to the inflow-side surface of the wall, while the oxidation-active coating fills the pores up to the outflow-side surface of the wall. This arrangement likewise satisfies all requirements existing through the assumed reaction mechanism and the required back-pressure properties. By virtue of the arrangement of the SCR-active coating over the entire length of the device, the diesel particulate filter catalytically activated in this way exhibits not only an ammonia blocking function but additionally full low-temperature SCR activity.

Figure 5:
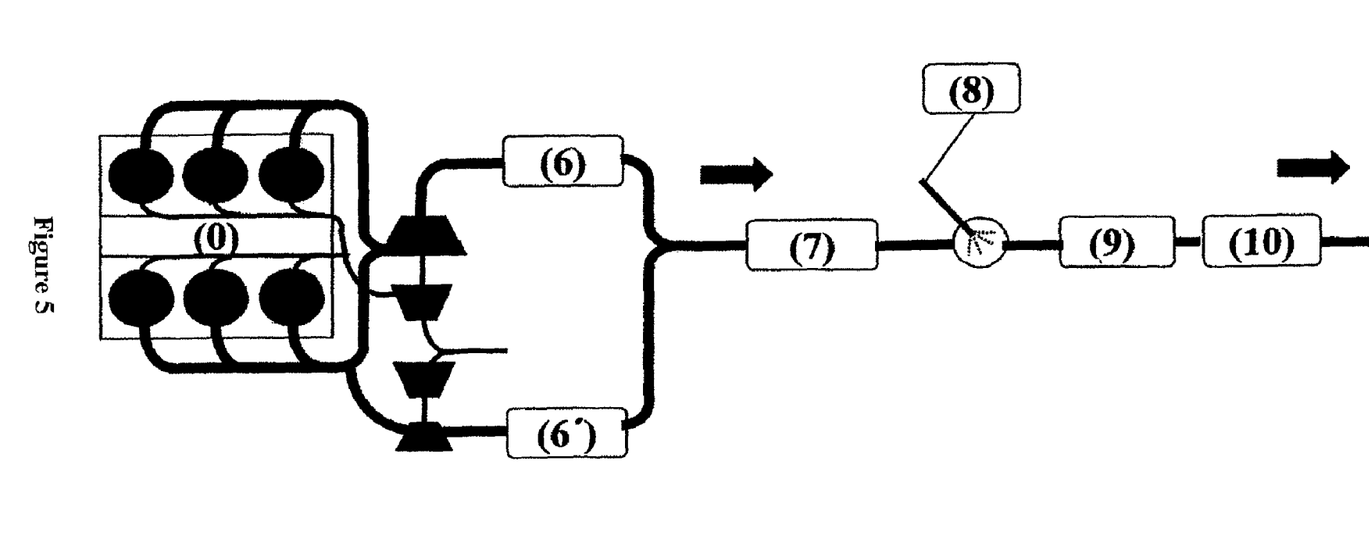
FIG. 5: Exhaust gas aftertreatment system for removing nitrogen oxides and particulates from the exhaust gas of internal combustion engines (0) operated under predominantly lean conditions, according to the prior art, in a two-flow configuration, which comprises a diesel oxidation catalyst (6, 6'), an optionally catalytically active diesel particulate filter (7), a metering unit for the reducing agent required in the SCR reaction (8), for example urea, an SCR catalyst (9) and a downstream ammonia trap catalyst (10).

The use of the inventive catalytically active diesel particulate filter allows conventional exhaust gas aftertreatment systems for removing nitrogen oxides and particulates from the exhaust gas of internal combustion engines operated under predominantly lean conditions to be simplified considerably. FIG. 5 shows, by way of example, a prior art exhaust gas system, as described in WO 99/39809, in the configuration as a two-flow system. Each cylinder bank of the engine (0) therein is connected to an exhaust gas system part which comprises a diesel oxidation catalyst (6, 6'). The combination of the exhaust gas lines is followed downstream, in flow direction, successively by an optionally catalytically activated diesel particulate filter (7), a metering unit for the reducing agent (8) required in the SCR reaction, for example urea, and an SCR catalyst (9). To prevent ammonia breakthroughs, a downstream ammonia slip catalyst (10) is required.

Figure 6:
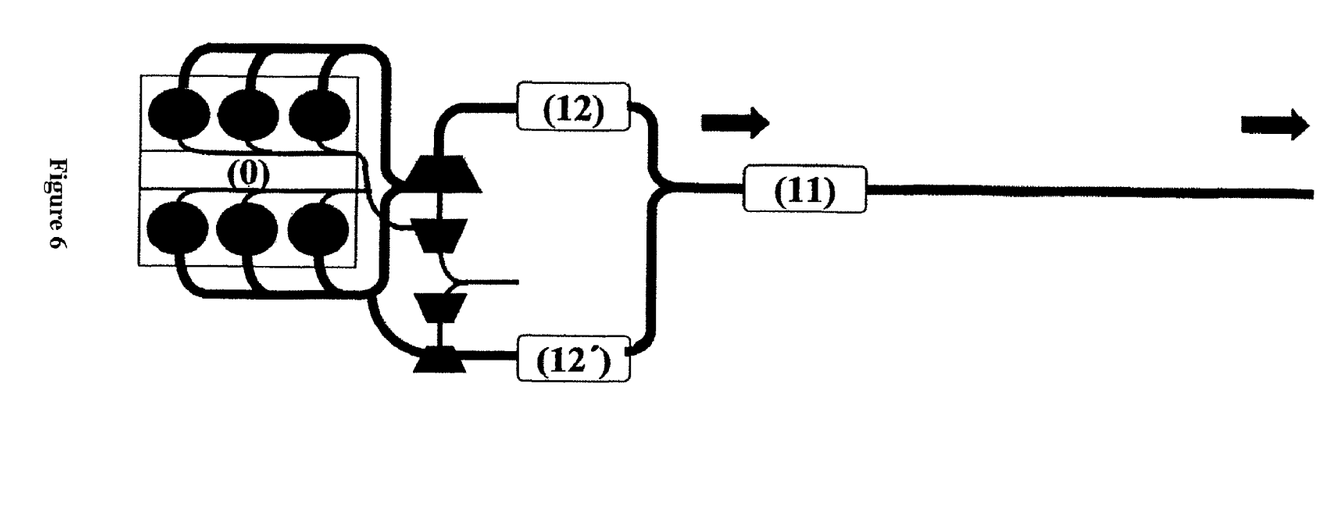
FIG. 6: Inventive exhaust gas aftertreatment system for removal of nitrogen oxides and particulates from the exhaust gas of internal combustion engines (0) operated under predominantly lean conditions in a two-flow configuration, which comprises an inventive catalytically active diesel particulate filter (11) and, on the inflow side, a nitrogen oxide storage catalyst (12, 12').

The use of the inventive device allows the essential constituents of such an exhaust gas aftertreatment system to be reduced. To remove nitrogen oxides and particulates from the exhaust gas of internal combustion engines operated under predominantly lean conditions, it is thus sufficient when a corresponding system comprises a catalyst suitable for removal of nitrogen oxides and an inventive catalytically active diesel particulate filter. The catalyst suitable for removal of nitrogen oxides may be a nitrogen oxide storage catalyst (12, 12') arranged on the inflow side of the diesel particulate filter (11) according to this invention. Such an embodiment is shown schematically in FIG. 6 for the case of a two-flow configuration of the system.

Figure 7:
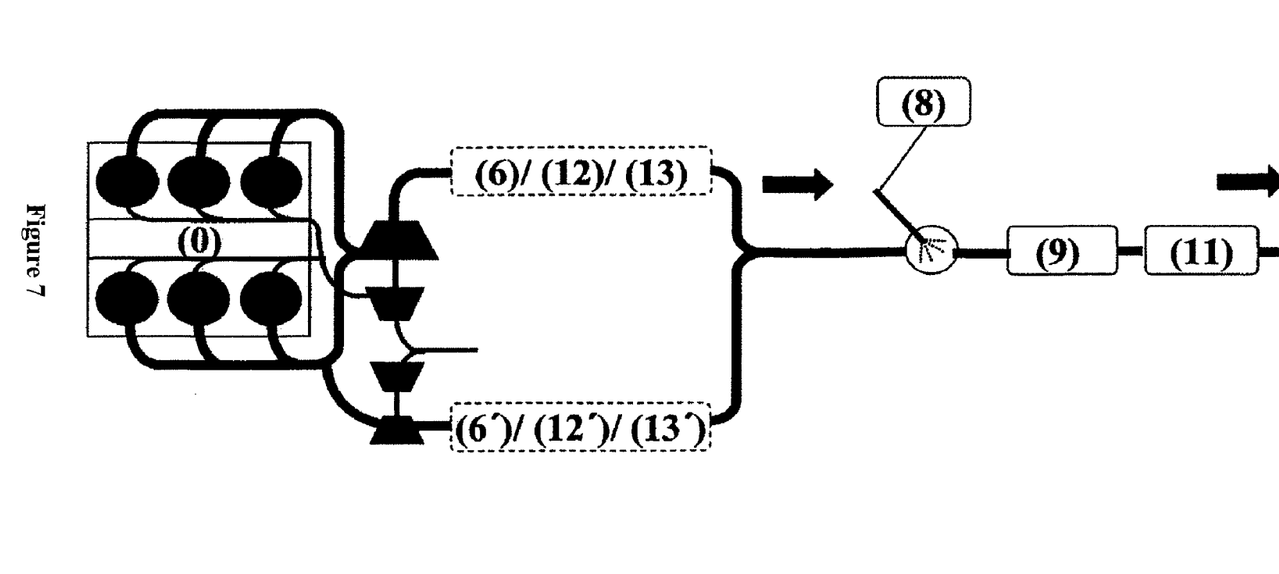
FIG. 7: Inventive exhaust gas aftertreatment system for removal of nitrogen oxides and particulates from the exhaust gas of internal combustion engines (0) operated under predominantly lean conditions in a two-flow configuration, which comprises an inventive catalytically active diesel particulate filter (11) and, on the inflow side, an SCR catalyst (9) with a unit for metered addition of ammonia or a compound decomposable to ammonia (8). Optionally, a diesel oxidation catalyst (6, 6') or/and a nitrogen oxide storage catalyst (12, 12') or/and a three-way catalyst (13, 13') may be arranged between engine (0) and metering unit (8).

In a preferred form of the inventive exhaust gas aftertreatment system, the catalyst suitable for denitrification used is an SCR catalyst (9) with an equipment for metered addition of ammonia or of a compound decomposable to ammonia (8), which is likewise present on the inflow side of the inventive diesel particulate filter (11). Such an embodiment is shown schematically in FIG. 7 for the case of a two-flow configuration of the system. In this case, it may be advantageous for use in some vehicle types when a diesel oxidation catalyst (6, 6') or a three-way catalyst (13, 13') or a nitrogen oxide storage catalyst (12, 12') or combinations thereof are arranged in the emission control system between the internal combustion engine (0) operated under predominantly lean conditions and the equipment for metered addition of ammonia or of a compound decomposable to ammonia (8).

The figures and examples which follow are intended to illustrate the invention in detail.

In the examples described below, various embodiments of the inventive catalytically active diesel particulate filters were produced. Their reactivity and selectivity in the ammonia oxidation was studied on a model gas test bench compared to the conventional diesel particulate filter produced in the comparative example. The following test conditions were selected:

| Composition of the model gas | |
|---|---|
| NH$_3$ [ppm by vol.]: | 450 |
| O$_2$ [% by vol.]: | 5 |
| H$_2$O [% by vol.]: | 1.3 |
| N$_2$: | Remainder |
| General test conditions | |
| Space velocity [h$^{-1}$]: | 60 000 |
| Temperature [° C.]: | 550, 500; 450; 400; 350; 300; 250; 200; 175 |
| Conditioning before start of measurement: | Model gas atmosphere; 600° C.; a few minutes |

By means of a suitable gas analysis system, the concentrations of ammonia, dinitrogen monoxide, nitrogen monoxide and nitrogen dioxide were detected downstream of the catalyst. Under the justified assumption that, apart from these nitrogen-containing gases and molecular nitrogen, no further nitrogen-containing reaction products form from the ammonia oxidation, the following balance equation can be used to determine the concentration of the reaction target product N$_2$:

$$C_{N_2}=1/2 \cdot (C_{NH_3,inlet}-C_{NH_3,outlet}-2 \cdot C_{N_2O}-C_{NO}-C_{NO_2})$$

The nitrogen concentration thus obtained and the ammonia concentration metered in are used to calculate the selectivity for nitrogen as follows:

$$S_{N_{2x}}[\%] = \frac{C_{N_2}}{0.5 \cdot C_{NH_3,inlet}} \cdot 100$$

Figure 8:
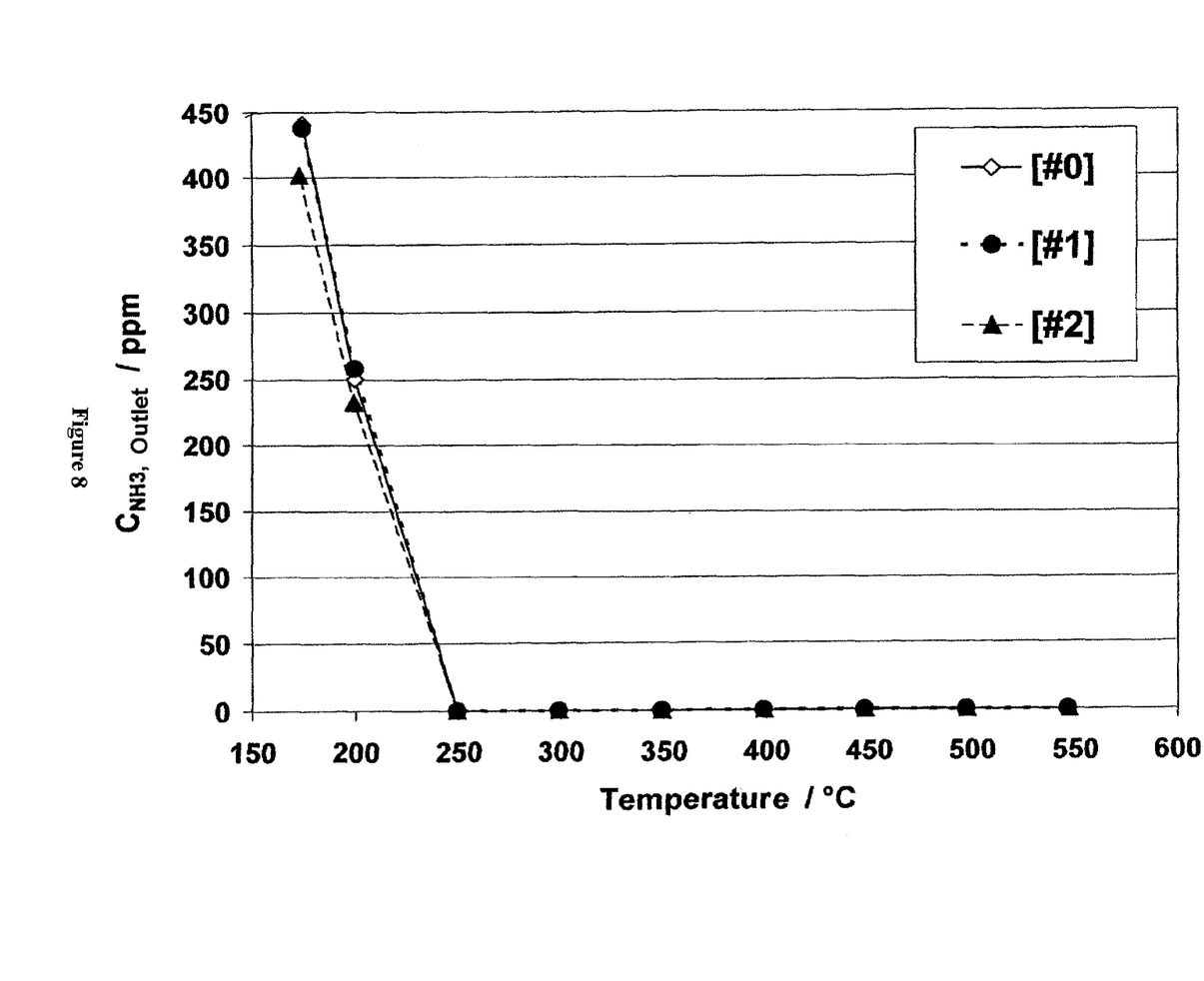
FIG. 8: Activity in the ammonia oxidation, measured on a prior art wall flow filter substrate provided with an oxidation-active coating ([#0]; ◊), and on two inventive catalytically active diesel particulate filters with an oxidation-active coating and an SCR-active coating. The inventive diesel particulate filter [#1] (●) comprises, in the SCR-active coating, an iron-exchanged zeolite, the inventive diesel particulate filter [#2] (▲) a copper-exchanged zeolite.
Figure 9:
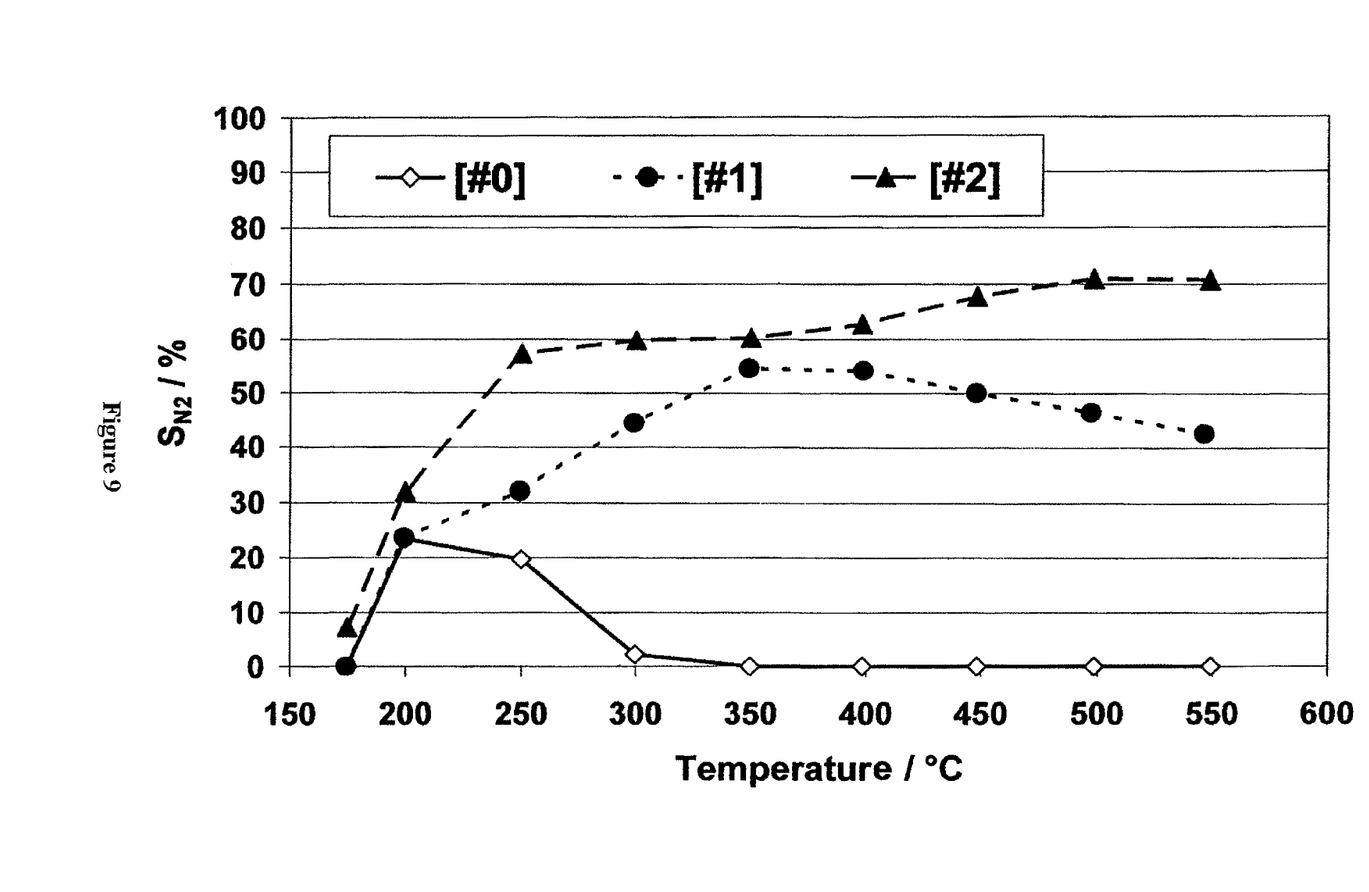
FIG. 9: Selectivity for nitrogen in the ammonia oxidation, measured on a prior art wall flow filter substrate provided with an oxidation-active coating ([#0]; ◇), and on two inventive catalytically active diesel particulate filters with an oxidation-active coating and an SCR-active coating. The inventive diesel particulate filter [#1] (●) comprises, in the SCR-active coating, an iron-exchanged zeolite, the inventive diesel particulate filter [#2] (▲) a copper-exchanged zeolite.

To assess the measurement results, the concentration of ammonia downstream of the catalyst and the selectivity for nitrogen were plotted as a function of the temperature. The results are shown in FIGS. 8 and 9.

COMPARATIVE EXAMPLE

A wall flow filter substrate composed of silicon carbide was provided with a conventional oxidation-active coating which was introduced into the wall with the aid of the procedure described in DE 10 2004 040 548 A1.

The filter substrate had a diameter of 14.4 centimeters and a length of 7.62 centimeters, and had 47 cells per square centimeter with a wall thickness of 0.3 millimeter. The walls of the filter substrate had pores with a mean diameter of 20 micrometers; the porosity of the walls was 60%.

The oxidation-active coating comprised essentially platinum, which was supported on a high-surface area aluminum oxide doped with lanthanum oxide. The amount of coating applied was selected such that the finished diesel particulate filter contained 0.7 g/l of noble metal, based on the volume of the coated filter substrate.

Three drilled cores with a diameter of 2.54 centimeters were taken from the finished diesel particulate filter. In a model gas system, the characteristic ammonia oxidation performance was studied by the method described above on one of these drilled cores [#0].

Example 1

A coating which was active in the SCR reaction and comprised predominantly iron-exchanged zeolites was applied to the inflow side of a second drilled core which had been taken from the diesel particulate filter from the comparative example. The length of the coated zone was 2.54 centimeters, i.e. 33% of the length of the overall component. 50 g/l of the SCR-active material, based on the volume of the filter substrate, were applied.

The characteristic ammonia oxidation performance of the inventive catalytically active diesel particulate filter [#1] thus obtained was studied by the above-described method in the model gas system.

Example 2

A coating which was active in the SCR reaction and comprised predominantly copper-exchanged zeolites was applied to the inflow side of the third drilled core which had been taken from the diesel particulate filter from the comparative example. The length of the coated zone was 2.54 centimeters, i.e. 33% of the length of the overall component. 50 g/l of the SCR-active material, based on the volume of the filter substrate, were applied.

The characteristic ammonia oxidation performance of this inventive catalytically active diesel particulate filter [#2] was also studied by the method described above in the model gas system.

FIGS. 8 and 9 show the result of the studies in the model gas.

In FIG. 8, the ammonia concentration downstream of the catalyst is plotted as a function of the reaction temperature. This concentration serves as a measure of the general activity of the diesel particulate filters studied in the ammonia oxidation. It is obvious that the general ammonia oxidation activity of the inventive diesel particulate filters does not differ significantly from the conventional diesel particulate filter: above 250° C., ammonia is oxidized completely.

The significant advantage of the inventive catalytically active diesel particulate filters is found in the selectivity of the ammonia oxidation for nitrogen. While this is lost above 300° C. in the case of the conventional diesel particulate filter (O), since ammonia is completely overoxidized to nitrogen oxides (predominantly NO$_2$), the inventive diesel particulate filters exhibit outstanding selectivity data over the entire temperature range. The best results with selectivity values of more than 70% are observed for the diesel particulate filter [#2] (▲) with the copper-containing, SCR-active coating, but the inventive diesel particulate filter [#1] (●) with the iron-containing SCR-active coating also exhibits good selectivity values of more than 30% in the 250 to 550° C. temperature range.

The inventive catalytically active diesel particulate filter with ammonia blocking function is thus outstandingly suitable for use in exhaust gas systems which serve for the simultaneous removal of nitrogen-containing pollutant gases and particulates, and which can now be simplified in accordance with the invention in the manner described.

The invention claimed is:

1. A catalytically active diesel particulate filter for treating exhaust gas comprising a filter body and comprising an oxidation-active catalytic coating layer, and a further coating layer which is catalytically active in a SCR reaction, in which an ammonia storage material is present, wherein an arrangement of layers is maintained such that the exhaust gas to be cleaned primarily passes through the coating layer which is catalytically active in the SCR reaction and subsequently through the oxidation-active catalytic coating layer.

2. A catalytically active diesel particulate filter according to claim 1, wherein the ammonia storage capacity of the coating layer which is catalytically active in the SCR reaction is at least 20 millimeters per gram of catalyst material.

3. A catalytically active diesel particulate filter according to claim 2, wherein the coating layer which is catalytically active in the SCR reaction comprises one or more zeolites which have been exchanged with hydrogen cations or transition metal cations.

4. A catalytically active diesel particulate filter according to claim 3, wherein the coating layer which is catalytically active in the SCR reaction comprises one or more with iron or copper or iron and copper exchanged zeolites.

5. A catalytically active diesel particulate filter according to claim 3, wherein the coating layer which is catalytically active in the SCR reaction comprises beta-zeolite or Y-zeolite or faujasite or mordenite or ZSM-5 or combinations thereof.

6. A catalytically active diesel particulate filter according to claim 3, wherein the coating layer which is catalytically active in the SCR reaction is free of precious metals.

7. A catalytically active diesel particulate filter according to claim 1, wherein the oxidation-active catalytic coating layer is free of zeolites.

8. The catalytically active diesel particulate filter according to claim 7, wherein the oxidation-active catalytic coating layer comprises platinum or palladium or mixtures thereof on a support material selected from the group consisting of high-surface area active aluminum oxide, cerium oxide, zirconium oxide, titanium oxide, silicon oxide and mixtures or mixed oxides thereof.

9. The catalytically active diesel particulate filter according to claim 1, wherein the filter body is selected from the group consisting of ceramic wall flow filter substrates, sintered metal filter bodies, or ceramic foam structures and metallic foam structures.

10. The catalytically active diesel particulate filter as claimed in claim 9, wherein the filter body is selected from the group consisting of ceramic wall flow filter substrates and features walls with an open-pore structure with a porosity of 40 to 80% and a mean pore diameter of 9 to 30 micrometers.

11. The catalytically active diesel particulate filter as claimed in claim 10, wherein the oxidation-active catalytic coating layer is introduced into the pores of walls of the ceramic wall flow filter substrate over the entire length of the filter and is distributed homogeneously in a particular wall of the wall flow filter substrate.

12. The catalytically active diesel particulate filter as claimed in claim 11, wherein the oxidation-active catalytic coating layer fills the pores in walls of the ceramic wall flow filter substrate up to an inflow-side surface of the particular wall, and the coating layer which is catalytically active in the SCR reaction is applied to said surface.

13. The catalytically active diesel particulate filter as claimed in claim 12, wherein the catalytic coating layer which is active in the SCR reaction occupies 5 to 50% of the length of the filter and is arranged on the inflow side of the overall device.

14. The catalytically active diesel particulate filter as claimed in claim 11, wherein the oxidation-active catalytic coating layer fills pores in the walls of the ceramic wall flow filter substrate up to the outflow-side surface of the particular wall, and the coating layer which is catalytically active in the SCR reaction is likewise introduced into the pores of the walls and is distributed homogeneously in the particular wall but fills the pores up to the inflow-side surface of the particular wall.

15. The catalytically active diesel particulate filter according to claim 1, wherein the filter body serves as a support body for the oxidation-active catalytic coating layer, and occupies the entire length of said filter, and wherein the filter provided with the oxidation-active catalytic coating layer serves as the support body for the coating layer which is catalytically active in the SCR reaction.

16. The catalytically active diesel particulate filter as claimed in claim 15, wherein the coating layer which is catalytically active in the SCR reaction occupies 5 to 50% of the length of the filter and is arranged on the inflow side of the filter.

17. An exhaust gas aftertreatment system for removing nitrogen oxides and particulates form the exhaust gas of internal combustion engines operated under predominately lean conditions, wherein the exhaust gas aftertreatment system comprises a catalyst suitable for removing nitrogen oxides and a catalytically active diesel particulate filter according to claim 1.

18. The exhaust gas aftertreatment system according to claim 17, wherein the exhaust gas aftertreatment system comprises, on an inflow side of the catalytically activated diesel particulate filter, equipment for metered addition of ammonia or of a compound decomposable to ammonia, and an SCR catalyst.

19. The exhaust gas aftertreatment system according to claim 18, wherein a diesel oxidation catalyst or a three-way catalyst or a nitrogen oxide storage catalyst or combinations thereof is arranged between the internal combustion engine operated under predominantly lean conditions and the equipment for metered addition of ammonia or of a compound decomposable to ammonia.

20. The exhaust gas aftertreatment system according to claim 17, wherein the exhaust gas aftertreatment system comprises, on the inflow side of the catalytically active diesel particulate filter, a nitrogen oxide storage catalyst.

* * * * *